United States Patent [19]
Katsui et al.

[11] 3,986,014
[45] Oct. 12, 1976

[54] HOOD STRUCTURE FOR ELECTRONIC CALCULATORS

[75] Inventors: Saburo Katsui, Nara; Shinji Tsugei, Yamatokoriyama, both of Japan

[73] Assignee: Sharp Kabushiki Kaisha, Osaka, Japan

[22] Filed: July 17, 1973

[21] Appl. No.: 380,111

[30] Foreign Application Priority Data
July 17, 1972 Japan.......................... 47-84182[U]
Apr. 11, 1973 Japan.......................... 48-43244[U]

[52] U.S. Cl............................... 235/152; 312/223; 350/160 LC
[51] Int. Cl.²...................... G06F 15/30; G02F 1/28
[58] Field of Search ............... 312/223, 208; 35/39, 35/8 R, 9 H; 350/319, 160 LC, 150; 235/156, 152, 61 R; 178/7.82; 340/336, 382, 383; 240/108 R, 92; 40/106.21; 26/5 C

[56] References Cited
UNITED STATES PATENTS

| | | | |
|---|---|---|---|
| 2,763,855 | 9/1956 | Wilfert....................... | 340/382 |
| 3,257,507 | 6/1966 | Borberg et al..................... | 350/319 |
| 3,499,112 | 3/1970 | Heilmeier et al.................. | 350/160 |
| 3,613,351 | 10/1971 | Walton........................... | 350/150 |
| 3,647,285 | 3/1972 | Harvey et al. ..................... | 350/319 |
| 3,781,865 | 12/1973 | Yamazaki..................... | 350/160 LC |
| 3,881,807 | 5/1975 | Hosokawa et al. ............ | 350/160 LC |
| D226,921 | 5/1973 | Cone et al........................ | 26/5 C |

OTHER PUBLICATIONS

Microelectronic Calculator; Ragen Product Data; Ragen Precision Industries, Inc. – May 1972.
Johnson; Appliance – Apr. 1972, pp. 41–44.
Electronic World; "Reflective Liquid Crystal Displays", Nov. 1968; Pinsky, Al; pp. 29, 58.

*Primary Examiner*—Eugene G. Botz
*Assistant Examiner*—Errol A. Krass
*Attorney, Agent, or Firm*—Stewart and Kolasch, Ltd.

[57] ABSTRACT

Electronic calculators generally employ discharge type indication tubes, fluorescence type indication tubes, plasma tubes, light-emitting diodes, liquid-crystal units, etc., as read-out devices therefor. In particular, the liquid crystal indication units are different from the other type units in that they can not emit light themselves and need impingement of light beams thereon. A window or transparent portion is provided at a portion of a hood plate movably affixed on the calculator in order that ambient light beams and more specifically light beams at the rear of the calculator are caused to be incident on the liquid-crystal indication units therethrough. With such arrangement contrast of indication patterns may be emphasized.

8 Claims, 5 Drawing Figures

U.S. Patent Oct. 12, 1976 3,986,014
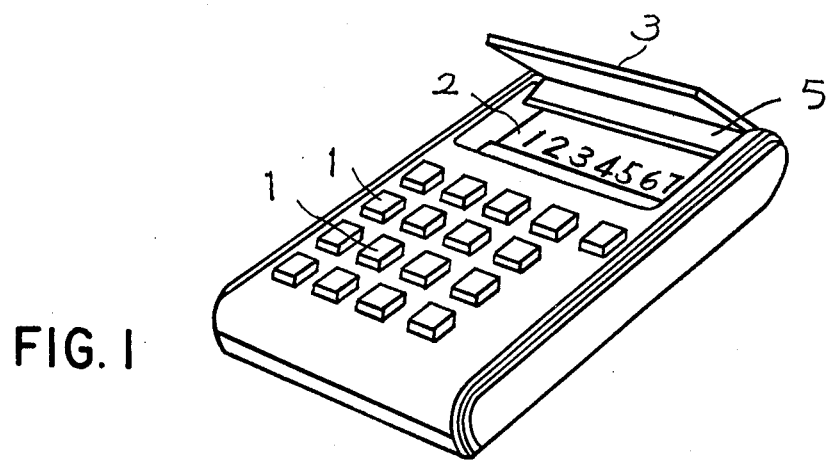
FIG. 1
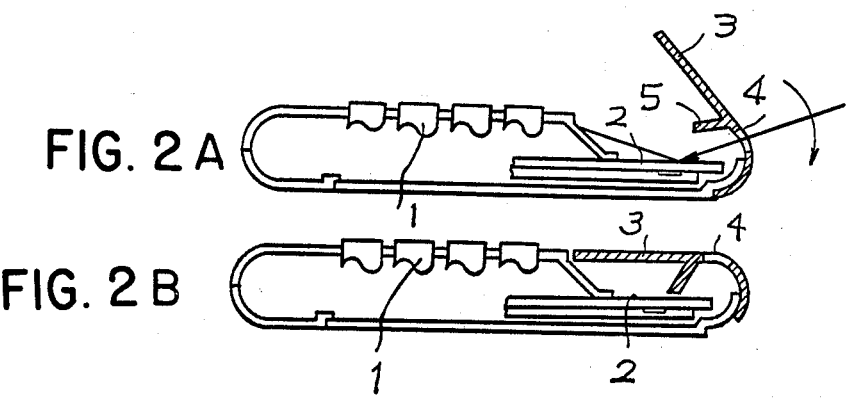
FIG. 2A
FIG. 2B
FIG. 4
FIG. 3

HOOD STRUCTURE FOR ELECTRONIC CALCULATORS

BACKGROUND OF THE INVENTION

This invention generally relates to electronic calculators provided with a hood construction for purposes of the interruption of ambient light beams and more partucularly a hood construction suitable for use in liquid-crystal indication units contained within electronic calculators.

In the electronic calculator art there is a continuing search for new and better reading-out methods and apparatus. There have been developed discharge type indication tubes, fluorescence type indication tubes, plasma type indication tubes, light-emitting diodes, liquid-crystal units and the other apparatus. In particular, the liquid-crystal indication is most advantageous over the other various types of read-out because of an extremely large reduction in power consumption. However, this type will provide a poor-contrast read out and need reception of incoming light beams. An additional or artificial light source may be provided about the electronic calculators to improve the contrast but such installation will cancel the inherent advantages of the liquid-crystal type because of requirement of a power for the additional light source.

OBJECTS AND SUMMARY OF THE INVENTION

An object of this invention is the provision of a hood structure for use in electronic calculators which avoids one or more of the disadvantages and limitations of the above conventional systems.

Another object of this invention is the provision of a hood structure capable of introducing effectively light beams from outside of the electronic desk-top or handy-type calculators and impinging such introduced light beams on the indication surface of the liquid-crystal indication systems.

Still another object of this invention is to provide an indication system in an electronic calculator which is especially simple in construction and does not increase the expenditure on the hood arrangement.

In accomplishing these and other objects, there is provided, in accordance with this invention, a hood structure wherein a window or transparent portion is provided in a manner to insure that ambient light beams are enabled to irradiate an indication surface of liquid-crystal systems contained in the body of electronic calculators. Needless to say, the other portion of the hood plate should remain opaque for general purposes of the interruption of arrival to operator's eyes of light beams regularly reflected on the indication surface of the liquid-crystal systems. The scattered light beams from the liquid-crystal systems provide visual indication for operator's eyes. However, reflected light beams from the same should be prevented from directly entering into operator's eyes. To this end, an upper surface or major surface of the calculator body is comparatively higher than the indication surface of the liquid-crystal systems.

BRIEF DESCRIPTION OF THE DRAWINGS

FIG. 1 is a perspective view of an electronic calculator in accordance with this invention.

FIGS. 2(A) and 2(B) are sectional side views of the electronic calculator in hood open and closed states respectively.

FIG. 3 is a perspective view of a hood plate used in the calculator.

FIG. 4 is a perspective view of a modification of the hood plate.

DESCRIPTION OF THE PREFERRED EMBODIMENTS

Referring now to FIG. 1, there is illustrated a desk-top or handy type electronic calculator which is provided with a plurality of digit keys and function keys 1 and a liquid-crystal indication system 2 of multi-digit at an upper surface. As well known, each digit unit within the liquid-crystal system has, for example, a layer of a nematic liquid crystal composition of a type that scatters light due to turbulence in the layer created by the application of a voltage across the layer. Furthermore, each unit includes a pair of electrodes one of which is made of light reflection materials. A hood structure 3 associated with the indication system 2 is movably mounted on the end portion of the upper surface to open and close the indication section of the liquid-crystal system 2. The hood plate 3 generally serves to interrupt arrival to the operator's eyes of light beams or more specifically light beams at the rear of the hood plate 3 which will impinge on the indication surface of the liquid-crystal system 2 and reflect therefrom.

The heart of this invention is a window or a transparent portion 4 which is provided at a portion of the hood plate 3, which window 4 enables ambient light beams to pass therethrough and strike the indication section of the liquid-crystal system 2. When the ambient light beams irradiate the reflection mode liquid-crystal system and a voltage is applied across the electrodes of the system, light beams will be scattered in the region of the electrode intersection causing some of the light to be observed by the operator. In this manner the liquid-crystal system 2 receives light beams in front of the hood 3 together with light beams at the back of the hood 3 via the window 4. Provision of the window 4 will effect a very sharp and well-defined read-out. Thus the indicating contents in the liquid-crystal system 2 can be recognized with ease.

One end portion of the hood plate 3 is of semi-circular shape as well as the corresponding portion of the calculator body which is very closely adjacent the semi-circular shape portion. In opening and closing the indication window or section in the liquid-crystal system 2, the semi-circular portion of the hood structure 3 slides along the semi-circular peripheral edge portion of the calculator body. The window 4 of this invention is positioned at the semicircular portion of the hood 3 and accordingly the window 4 itself is semicircular in section. The lens function, therefore, is afforded to the window thereby to increase the efficiency of light collection.

The view at the back of the hood 3 may enter into operator's eyes because of transparent property due to the provision of the window 4. For this reason a penthouse 5 is preferrably provided above the window 4.

As illustrated in FIGS. 1 and 2(A) and 2(B), the upper surface on which the keys 1 are deposited is considerably higher than the indication face of the liquid-crystal system 2 whereby preventing for entering into operator's eyes dazzling light beams, namely, the light beams introduced through the window 4 and regularly reflected from the indication face. In other words, the reflected light beams from the liquid-crystal system 2 impinge on the side wall of the key board section, which intercepts arrival of such reflection light beams to operator's eyes. The scattered light beams from the liquid-crystal system 2 are not prevented from reaching the operator's eyes and provide a visual indication of contents in a register or operation results in the calculator.

FIG. 3 shows an example of the hood structure which is composed of black and opaque resin material 31, for example, acryl resin, and transparent material 32, for example, acryl resin or plastics which is the heart of this invention. One simple way of providing the hood structure shown is to coat the acryl resin except for the window portion 4 with black materials. The example illustrated does not show the use of a penthouse 5.

FIG. 4 is a modification of the hood structure 3. This comprises a transparent base 33 such as acryl resin and a black coloured aluminum plate 34 affixed to the transparent base 33, except for the window portion 4. Alternatively, a window portion of transparent material may be secured to the opaque base material. When the window portion is closed by the transparent material, this will prevent an invasion of dust into the body of the calculator in the hood closed conditions.

We claim:

1. A housing for an electronic calculator comprising a calculator body having an upper surface provided with a keyboard section and an indication section of the liquid-crystal type, a tiltable, shielding hood structure slidably mounted on the end portion of the upper surface of said calculator body adjacent said indication section, said shielding hood structure being tiltable from an open position to a closed position above only said indication section, and a window portion disposed adjacent said indication section for introducing ambient light beams through the tiltable shielding hood structure into the indication section of the calculator when the tiltable shielding hood structure is in the open position, said light beams being scattered after striking the indication section so that they do not reflect directly into the operator's eyes.

2. The housing for the electronic calculator according to claim 1 wherein the indication section is recessed from the level of the keyboard section so that light beams entering the window portion and impinging on the indication section, when the hood structure is open, will strike the side wall of the keyboard section.

3. The housing for the electronic calculator according to claim 2, wherein said end portion of the upper surface of the calculator body has a semicircular shape and said hood structure has a correspondingly semicircular shaped portion, said semicircular portion of the hood structure being adapted to slide along the semicircular peripheral edge portion of the calculator body.

4. The housing for the electronic calculator according to claim 2, wherein the window portion is positioned at the semicircular portion of the hood structure.

5. The housing for the electronic calculator according to claim 4, wherein the window portion is semicircular in section and provided with a transparent material, said window portion thereby taking on a lens function which increases the efficiency of light collection.

6. The housing for the electronic calculator according to claim 5, wherein a penthouse or ridge portion extends from the inside of the hood structure and is provided above the window portion and disposed between said window portion and the free end of the hood structure.

7. The housing for the electronic calculator according to claim 1, wherein the hood structure contains an opaque portion and a transparent portion which represents the window portion.

8. The housing for the electronic calculator according to claim 7, wherein the opaque portion is an aluminum plate which contains a black coating.

* * * * *